United States Patent
Chase (10) Patent No.: US 10,045,481 B2
(45) Date of Patent: Aug. 14, 2018

(54) LAWNMOWER DISCHARGE DEVICE

(71) Applicant: Rick Chase, Bainbridge, NY (US)

(72) Inventor: Rick Chase, Bainbridge, NY (US)

(*) Notice: Subject to any disclaimer, the term of this patent is extended or adjusted under 35 U.S.C. 154(b) by 95 days.

(21) Appl. No.: 14/795,197

(22) Filed: Jul. 9, 2015

(65) Prior Publication Data

US 2016/0120121 A1    May 5, 2016

Related U.S. Application Data

(60) Provisional application No. 62/075,568, filed on Nov. 5, 2014.

(51) Int. Cl.
*A01D 67/00* (2006.01)
*A01D 34/71* (2006.01)

(52) U.S. Cl.
CPC .................... *A01D 34/71* (2013.01)

(58) Field of Classification Search
CPC .... A01D 34/71; A01D 43/073; A01D 43/063; A01D 34/81; A01D 57/30; A01D 67/00
USPC ............................ 56/320.2; 37/243; 141/388
See application file for complete search history.

(56) References Cited

U.S. PATENT DOCUMENTS

| | | | | |
|---|---|---|---|---|
| 2,777,481 A | * | 1/1957 | Atkinson | B61D 5/002 141/382 |
| 2,974,468 A | * | 3/1961 | Lundell | A01D 43/086 56/129 |
| 3,075,813 A | * | 1/1963 | Vohl | E01H 5/045 37/236 |
| 3,251,631 A | * | 5/1966 | Hennen | A01D 43/087 193/22 |
| 3,420,041 A | * | 1/1969 | Irgens | A01D 34/71 56/320.2 |
| 3,453,812 A | * | 7/1969 | Heidner | A01D 34/71 56/320.2 |
| 3,580,351 A | * | 5/1971 | Mollen | E01H 5/04 180/19.1 |
| 3,646,739 A | * | 3/1972 | Dahl | A01D 34/828 56/320.1 |
| 3,726,029 A | * | 4/1973 | Deen | E01H 5/045 37/261 |
| 4,694,594 A | * | 9/1987 | Thorud | E01H 5/098 37/233 |

(Continued)

*Primary Examiner* — Thomas B Will
*Assistant Examiner* — Joan D Misa
(74) *Attorney, Agent, or Firm* — Global Intellectual Property Agency, LLC; Jordan Sworen (57) ABSTRACT

A lawnmower discharge device for discharging grass clippings in various directions. The lawnmower discharge device includes a planar baseplate that can be removably secured to a discharge port of a lawnmower. The baseplate includes an opening to provide access for grass clippings to move therethrough. The device further includes a curved, tubular discharge chute rotatably secured to the baseplate, wherein the discharge chute is positioned over the opening of the baseplate in order to allow grass clippings to move therethrough. The lawnmower discharge device further includes a rotating mechanism disposed between the baseplate and the discharge chute in order to allow the chute to rotate relative to the fixed baseplate. In this way, the lawnmower discharge device can be removably secured to a lawnmower and rotated thereon in order to prevent grass clippings from spraying onto flowerbeds, patios, sidewalks, and the like.

15 Claims, 5 Drawing Sheets

(56) References Cited

U.S. PATENT DOCUMENTS

| | | | |
|---|---|---|---|
| 4,756,101 A * | 7/1988 | Friberg | E01H 5/098 37/244 |
| 4,780,042 A * | 10/1988 | Reuter | B22D 41/06 414/421 |
| 4,782,650 A * | 11/1988 | Walker | A01D 43/063 141/198 |
| 4,897,988 A * | 2/1990 | Schweitz | A01D 43/0631 56/17.4 |
| 5,033,260 A * | 7/1991 | Jerry | A01D 43/0631 56/202 |
| RE33,726 E * | 10/1991 | Thorud | E01H 5/04 37/233 |
| 5,398,491 A * | 3/1995 | Hartley | A01D 34/71 56/320.2 |
| 5,438,770 A * | 8/1995 | Miller | E01H 5/045 37/227 |
| 5,457,946 A * | 10/1995 | Deitrick | A01D 43/063 56/16.6 |
| 5,499,494 A | 3/1996 | Boshell | |
| 5,813,152 A * | 9/1998 | Weight | E01H 5/08 37/249 |
| 5,826,416 A | 10/1998 | Sugden | |
| 6,502,335 B2 * | 1/2003 | Prochnow | F16D 13/22 37/244 |
| 6,751,937 B2 | 6/2004 | Kobayashi et al. | |
| 6,874,309 B1 * | 4/2005 | Bellis, Jr. | A01D 42/005 56/320.2 |
| 6,971,224 B1 | 12/2005 | Hancock | |
| 7,406,817 B2 * | 8/2008 | Bledsoe | A01D 34/005 56/320.2 |
| 7,448,195 B2 * | 11/2008 | Kohler | A01D 34/71 56/320.2 |
| 7,735,246 B2 * | 6/2010 | Kaskawitz | E01H 5/045 37/260 |
| D685,822 S * | 7/2013 | Elgin | D15/17 |
| D700,630 S * | 3/2014 | Davis | D15/17 |
| 8,794,660 B1 * | 8/2014 | Stover | A01D 34/64 16/110.1 |
| 2004/0128970 A1 | 7/2004 | Gazlay | |
| 2008/0209771 A1 * | 9/2008 | Jerger | E01H 5/045 37/260 |

* cited by examiner

LAWNMOWER DISCHARGE DEVICE

CROSS REFERENCE TO RELATED APPLICATION

This application claims the benefit of U.S. Provisional Application No. 62/075,568 filed on Nov. 5, 2014. The above identified patent application is herein incorporated by reference in its entirety to provide continuity of disclosure.

BACKGROUND OF THE INVENTION

Field of the Invention

The present invention relates to lawnmower discharge devices. More specifically, the present invention provides a lawnmower discharge device that comprises a curved, tubular discharge chute and a planar baseplate, wherein the baseplate comprises an opening. The discharge chute is disposed over the opening and rotatably secured to the front surface of the baseplate, wherein the chute is adapted to discharge grass clippings therefrom. The rear surface of the planar baseplate is adapted to removably secure to a discharge port of a lawnmower.

Many push lawnmowers have a fixed discharge port adapted to spray grass clippings and debris to the rear or side of the lawnmower, depending where the discharge port is positioned on the lawnmower. Adjacent to most grassy lawn areas are sidewalks, flowerbeds, and the like. Many individual choose to avoid spraying grass clippings and debris on such areas in order to avoid safety hazards resulting from wet, slippery grass clippings. An individual walking, running, or driving on wet grass clippings can easily slip or skid thereon, resulting in an injury or a vehicular accident. Furthermore, such grass clippings and debris ruin the aesthetic appeal of the sidewalk, flowerbed, or the like. In order to avoid unwanted discharge from spraying on certain areas, the individual must mow their lawn in a defined direction.

Unfortunately, devices disclosed in the prior art are limited when mowing in such direction, the grass clippings and debris land on and cover freshly mowed grass. Therefore, additional work results requiring the individual to clean up the excess grass clippings and debris once he or she has completed mowing the lawn. However, if the individual directs the grass clippings onto an area that has not yet been mowed, the additional work is avoided. Therefore, there exists a need in the prior art for a discharge chute that rotatably secures to a lawnmower and that is adapted to be adjusted so as to discharge grass clippings and debris in a desired direction.

It is submitted that the present invention substantially diverges in design elements from the prior art and consequently it is clear that there is a need in the art for an improvement to existing lawnmower discharge devices. In this regard the instant invention substantially fulfills these needs.

SUMMARY OF THE INVENTION

In view of the foregoing disadvantages inherent in the known types of lawnmower discharge devices now present in the prior art, the present invention provides a new lawnmower discharge device wherein the same can be utilized for providing convenience for the user when mowing a lawn.

It is therefore an object of the present invention to provide a new and improved lawnmower discharge device that has all of the advantages of the prior art and none of the disadvantages.

It is another object of the present invention to provide a lawnmower discharge device comprising a planar baseplate having an opening thereon in order to provide access for grass clippings to move therethrough, wherein the rear surface of the planar baseplate is adapted to removably secure onto a discharge port of a lawnmower.

Another object of the present invention is to provide a lawnmower discharge device comprising a tubular discharge chute rotatably secured to the planar baseplate by a rotating mechanism, wherein the discharge chute fits over the opening on the front surface of the baseplate adapted to allow grass clippings to further move therethrough.

Yet another object of the present invention is to provide a lawnmower discharge device wherein the discharge chute is curved so as to allow a user to direct the placement of the grass clippings.

Yet another object of the present invention is to provide a lawnmower discharge device further comprising a vertical elongated rod secured to the baseplate and engaged with the rotating mechanism so as to allow a user to turn the rod and rotate the discharge chute.

Another object of the present invention is to provide a lawnmower discharge device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Reference is made herein to the attached drawings. Like reference numerals are used throughout the drawings to depict like or similar elements of the lawnmower discharge device. For the purposes of presenting a brief and clear description of the present invention, the preferred embodiment will be discussed as used for mowing a lawn with a push lawnmower and discharging grass clippings therefrom. The figures are intended for representative purposes only and should not be considered to be limiting in any respect.

Figure 1:
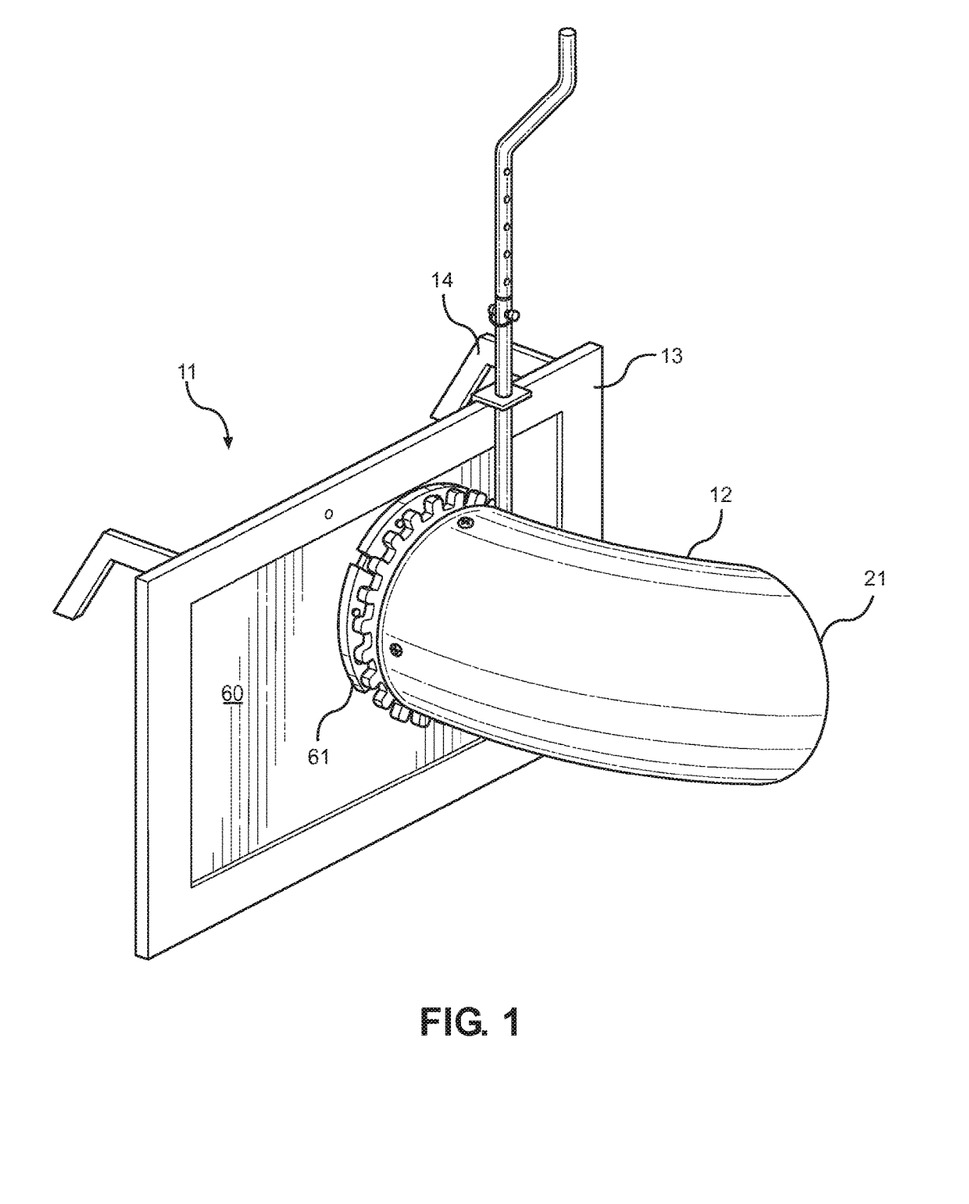
FIG. 1 shows a perspective view of an embodiment of the lawnmower discharge device.
Figure 3:
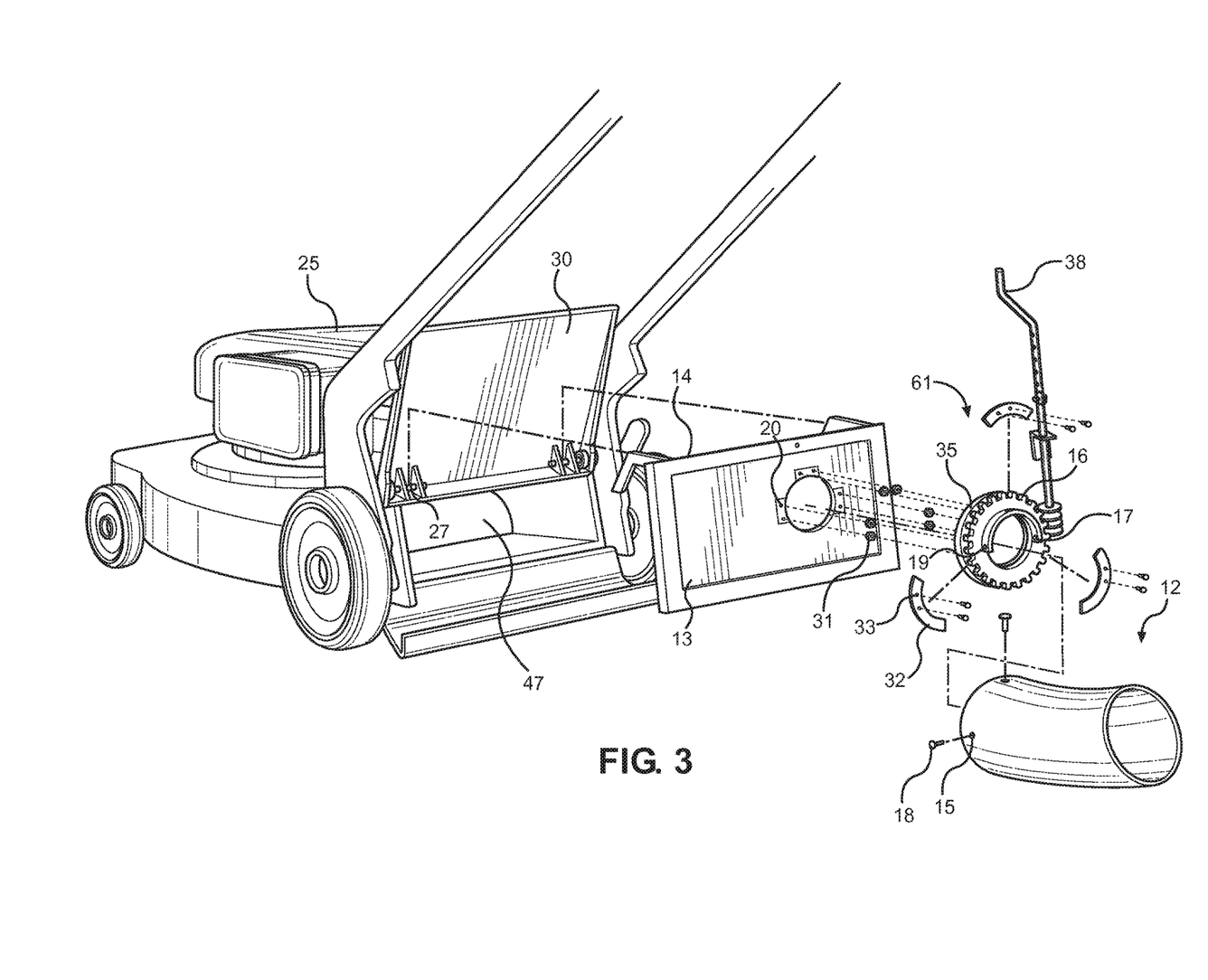
FIG. 3 shows an exploded view of an embodiment of the lawnmower discharge device.

Referring now to FIG. 1, there is shown a perspective view of an embodiment of the lawnmower discharge device. The lawnmower discharge device 11 comprises a planar baseplate 13 having a rear surface and a front surface 60, wherein the baseplate 13 is adapted to removably secure to a discharge port of a lawnmower (as referenced in FIG. 3, 47). A lawnmower discharges grass clippings from an opening in the discharge port once the grass has been cut by the lawnmower blades. The baseplate 13 is rectangular in shape, wherein the rear surface of the baseplate 13 includes one or more fasteners adapted to removably secure the baseplate 13 to the lawnmower. In the illustrated embodiment, the fasteners are a pair of hooks 14 adapted to fit over a pair of pins of the lawnmower. The hooks 14 are disposed on the upper corners of the rectangular baseplate 13 so as to fit over the corresponding pins of the lawnmower, as seen in FIG. 3. The baseplate 13 is preferably flat so to allow for the device 11 to be easily detached and attached to a lawnmower. The baseplate 13 is adapted to cover a rectangular discharge port, thereby preventing gaps therebetween. Gaps between the sides of the baseplate 13 and the discharge port could cause grass clippings to escape therefrom. In other embodiments, the baseplate 13 can be any suitable shape, as long as it is adapted to fit over and cover a lawnmower discharge port.

The baseplate 13 further comprises an opening thereon adapted to allow the grass clippings ejected from the opening of the discharge port to pass therethrough. The opening of the baseplate 13 is preferably positioned so as to align with the opening of the discharge port of the lawnmower. In this way, the grass clippings will pass directly from the lawnmower discharge port through the opening of the baseplate 13, thereby preventing grass clippings from becoming lodged behind the baseplate 13. The opening disposed on the baseplate 13 is circular. However, in other embodiments, the opening can be any suitable shape, such as square.

The lawnmower discharge device 11 further comprises a discharge chute 12 rotatably secured to the baseplate 13 by a rotating mechanism 61. The discharge chute 12 fits over the opening of the baseplate 13 so as to allow grass clippings to further pass therethrough, wherein the discharge chute 12 is adapted to rotate 360 degrees relative to the fixed baseplate 13. The discharge chute 12 extends perpendicularly from the front surface 60 of the baseplate 13. The discharge chute 12 is tubular in configuration having an open first end, an open second end 21, and one or more sidewalls. The first end includes one or more apertures adapted to receive a fastener therethrough in order to secure the discharge chute 12 to the rotating mechanism 61. The apertures are spaced at fixed intervals. The second end 21 of the discharge chute 12 is adapted to eject the grass clippings therefrom. The sidewall of the discharge chute 12 is curved and the second end 21 of the discharge chute 12 is angled towards the interior of the curved sidewall. In this way, the configuration of the discharge chute 12 is able to direct the grass clippings in a specific direction. In use, the grass clippings enter the first end of the discharge chute 12, impact the curved sidewall, and are discharged in the direction of the chute 12. The dimension of the first end of the chute is preferably the same dimension as the opening in the baseplate 13 so as to efficiently allow the grass clippings to pass therethrough.

Figure 2:
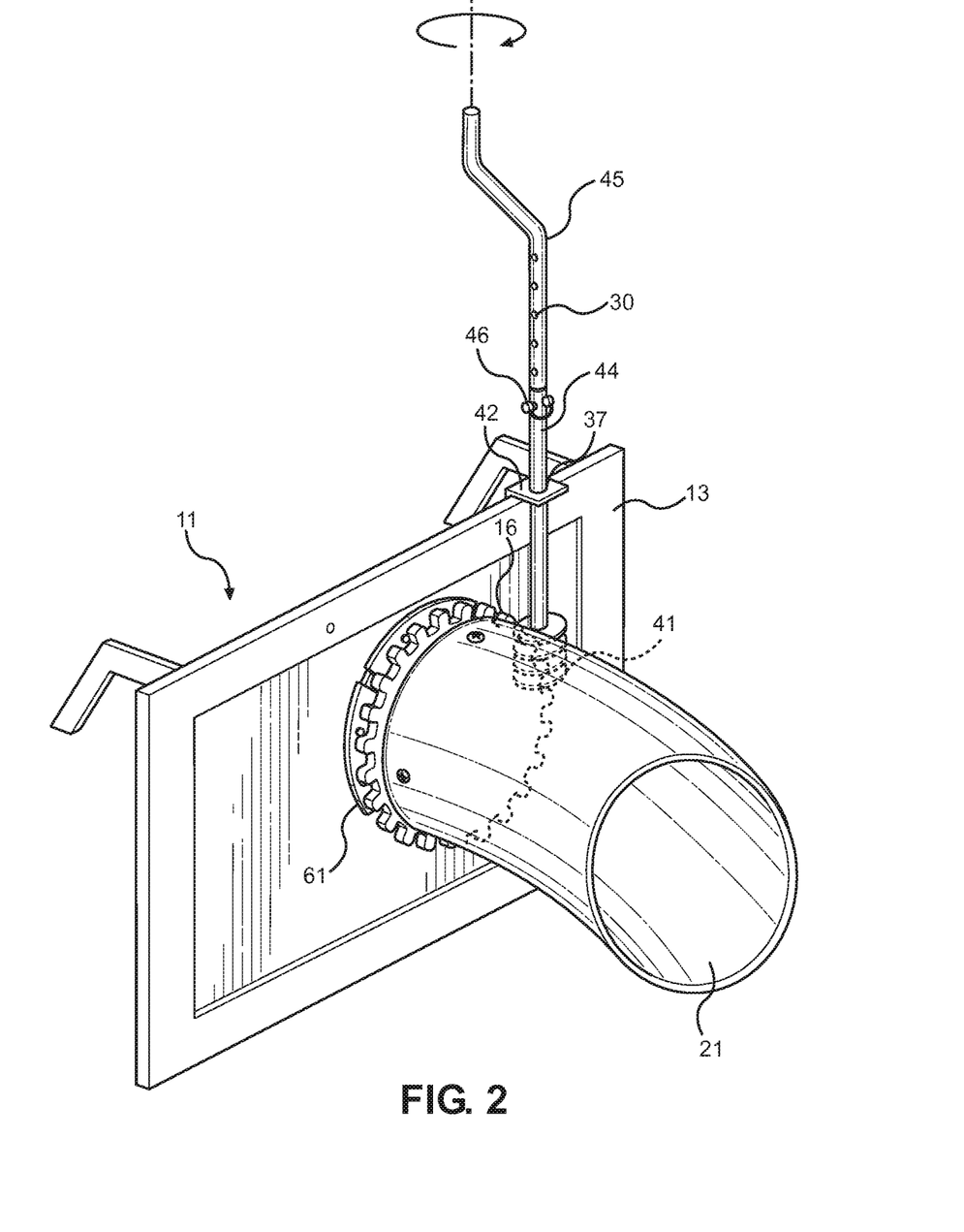
FIG. 2 shows a perspective view of an embodiment of the lawnmower discharge device in a rotated position.

Referring now to FIG. 2, there is shown a perspective view of an embodiment of the lawnmower discharge device in a rotated position. The lawnmower discharge device 11 further comprises an elongated, vertical rod 38 secured to the baseplate 13 and adapted to rotate the rotating mechanism 61. The elongated rod 38 is secured to the baseplate 13 by one or more fasteners. In the illustrated embodiment, the fastener is an L-shaped bracket 42, wherein the bracket 42 comprises a first part extending perpendicularly from a second part. The first part is horizontally oriented and comprises an opening 37, wherein the rod 38 is disposed therethrough. The first part rests on the upper edge of the baseplate 13. The second part is vertically oriented and secured to the upper end of the rear surface of the baseplate 13 by any suitable fastener, such as a screw.

The elongated rod 38 comprises a first end and a second end, wherein the second end is adapted to be used as a handle and comprises a bend so as to allow a user to rotate the rod 38. Furthermore, the elongated rod 38 is adapted to adjust in length, wherein the rod 38 comprises a first shaft 44 adapted to fit over a second shaft 45. Each shaft includes one or more apertures 30 disposed along the length thereof, wherein an aperture 30 of each shaft is adapted to align and receive a fastener 46 therethrough. A fastener 46, such as a screw, is disposed through the aligned apertures 30 to allow the rod 38 to remain in the desired position. The first end of the elongated rod 38 comprises a rotatable screw 41 thereon adapted to rotate the rotating mechanism 61. The rotating mechanism 61 comprises a sprocket 16 having one or more teeth thereon. The rotatable screw 41 engages with and is disposed adjacent to the sprocket 16, whereby the threading of the rotatable screw 41 receives the teeth of the sprocket 16 therein. As the elongated rod 38 is turned, the rotatable screw 41 rotates the sprocket 16.

Referring now to FIG. 3, there is shown an exploded view of an embodiment of the lawnmower discharge device. In the illustrated embodiment, the rotating mechanism 61 includes the sprocket 16 connected to a flange 35 in a stacked configuration, wherein the sprocket 16 is parallel to the flange 35. The sprocket 16 and flange 35 are connected by their interior perimeters. The interior perimeter allows grass clippings to pass therethrough. The sprocket 16 includes one or more tabs 17 extending perpendicularly from the interior perimeter thereof. The tabs 17 include one or more apertures 19 adapted to receive one or more fasteners therethrough. The edge of the first end of the discharge chute 12 is disposed flush against the surface of the sprocket 16, whereby the tabs 17 fit in the interior of the discharge chute 12. The apertures 15 of the chute 12 align with the apertures of the tabs 17, whereby a fastener, such as a screw 18, is placed therethrough securing the chute 12 to the sprocket 16.

The flange 35 is operably connected to the baseplate 13, wherein the flange 35 is adapted to rotate thereon. The flange 35 is disposed flush against the baseplate 13 over the opening thereof. In some embodiments, one or more washers are disposed between the baseplate 13 and the flange 35 so as to reduce the friction therebetween and assist the rotation of the flange 35. In the illustrated embodiment, the flange 35 is operably connected to the baseplate 13 by one or more bearings 31 disposed on the baseplate 13 and plurality of retaining sections 32 disposed in the gap between the flange 35 and the sprocket 16. The bearings 31 and retaining sections 32 are included in the rotating mechanism 61, wherein the bearings 31 engage the outer perimeter of the flange 35 and allow the flange 35 to rotate. The retaining sections 32 secure the bearings 31 and the flange 35 to the baseplate 13.

Each retaining section 32 comprises an elongated, curved bar and one or more apertures 33 disposed along the outer edges thereof. Part of the retaining section 32 rests on the flange 35 in order to secure the flange 35 to the baseplate 13 and the area comprising the apertures 33 is suspended over the edge of the flange 35 in order to align with the bearings 31 and a plurality of apertures 20 disposed on the baseplate 13. A fastener, such as a screw, is disposed through the aperture 33 in the retaining section 32, through the bearing 31, and through the aperture 20 disposed in the baseplate 13. In this way, the sprocket 16, flange 35, and discharge chute 12 are adapted to freely rotate relative to the baseplate 13.

In some embodiments, the rotating mechanism 61 includes a baseplate 13 with a lip extending perpendicularly from the opening, wherein the exterior surface of the lip is threaded. The interior of the corresponding discharge chute 12 is threaded, thereby allowing the chute 12 to screw onto the baseplate 13. The discharge chute 12 further comprises an aperture disposed on the lower end where the threads are disposed. Any type of suitable fastener, such as a thumbscrew, is disposed through the aperture, thereby rotatably securing the chute 12 on the baseplate 13 at a desired position.

The discharge port 47 on the lawnmower 25 is covered by a shield 30 when the lawnmower 25 is not in use in order to protect the discharge port 47. In operation, the shield 30 is lifted and the hooks 14 disposed on the rear surface of the baseplate 13 are aligned with and removably secured to the corresponding pins 27 of the lawnmower 25. The baseplate 13 is positioned over the discharge port 47. The length of the elongated rod 38 is adjusted in order to comfortably accommodate the height of the user. As the user is mowing their lawn, the elongated rod 38 can be rotated in order to change the direction the discharge chute 12 is spraying grass clippings therefrom. As the rod 38 is rotated, the rotatable screw disposed on the first end thereof engages the sprocket 16, thereby rotating the discharge chute 12.

Figure 4:
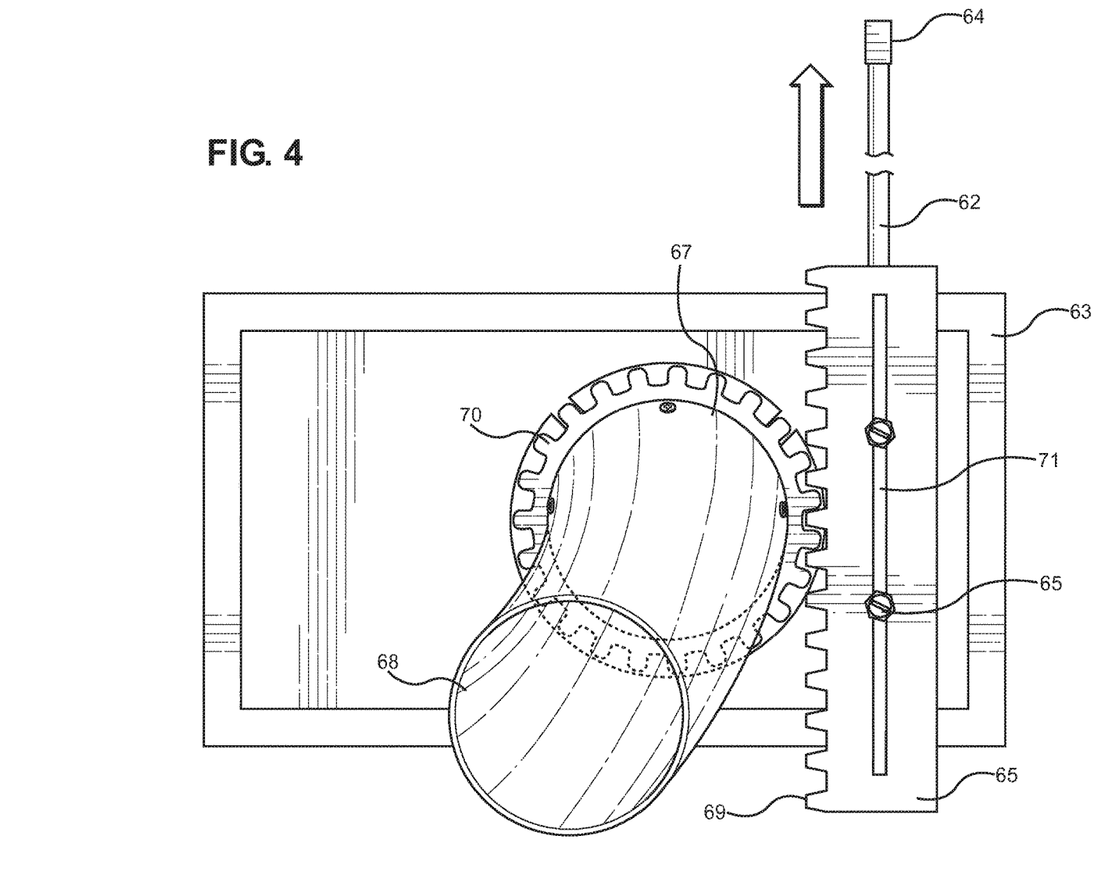
FIG. 4 shows a front perspective view of an alternative embodiment of the lawnmower discharge device.

Referring now to FIG. 4, there is shown a front perspective view of an alternative embodiment of the lawnmower discharge device. In an alternative embodiment, the elongated rod 62 comprises a handle 64 and an elongated panel 65, wherein the elongated panel 65 is adjustably secured to the baseplate 63. The elongated panel 65 is preferably substantially rectangular and comprises a plurality of teeth 69 that engage the sprocket 67 of the rotating mechanism 70 rather than having a rotatable screw disposed on the first end of the elongated rod 62. The handle 64 of the elongated rod 62 is adapted to be lifted upwards in order to rotate the discharge chute 68 and moved downwards in order to rotate the discharge chute 68 in an opposite direction. As the handle 64 is lifted, the teeth 69 on the elongated panel 65 engage the teeth of the sprocket 67, thereby rotating the sprocket 67 and discharge chute 68 secured thereon.

Figure 5:
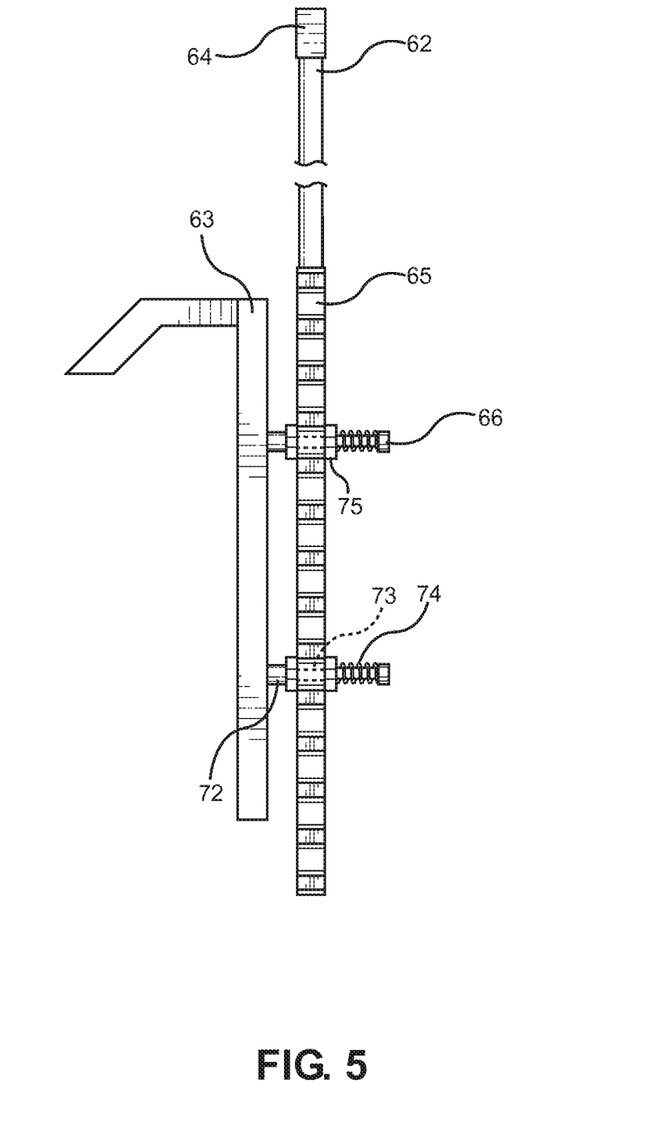
FIG. 5 shows a cross sectional view of the vertical elongated rod secured to the baseplate of the alternative embodiment of the lawnmower discharge device.

The elongated panel 65 further comprises an elongated slot 71 disposed on the surface thereof. The elongated slot 71 is adapted to receive a fastener therethrough in order to adjustably secure the elongated rod 62 to the baseplate 63. Referring now to FIG. 5, there is shown a cross sectional view of the vertical elongated rod secured to the baseplate of the alternative embodiment of the lawnmower discharge device. The elongated rod 62 is adjustably secured to the baseplate 63 by any suitable attachment mechanism. In the illustrated alternative embodiment, the attachment mechanism comprises a fixed assembly that allows the elongated rod 62 to slide upwards and downwards.

The attachment mechanism comprises a pair of screw receivers 72 vertically aligned to one another and perpendicularly extending from the baseplate 63. Each screw receiver 72 comprises a threaded interior adapted to receive a screw 73 therein. A screw 73 is disposed through the elongated slot 71 and fastened to each screw receiver 72. The screw 73 is further disposed through a pair of washers 75 that are positioned on either side of the elongated slot 71 in order to allow the elongated rod 62 to easily slide therealong. The head 66 of each screw 73 comprises a dimension that is larger than the dimension of the elongated slot 71 so as to prevent the elongated rod 62 from becoming removed from the lawnmower discharge device. A spring 74 is disposed around the screw so as to continuously provide tension against the elongated rod 62 so the rod 62 remains in an upright position. Furthermore, the tension from the spring 74 is adapted to allow the elongated rod 62 to move when additional force is provided, such as from a user lifting the handle 64, but prevents the rod 62 from moving once the rod 62 has been placed in a desired position.

It is therefore submitted that the instant invention as described has shown what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lawnmower discharge device, comprising:
   a planar baseplate, wherein said planar baseplate comprises an opening thereon adapted to allow grass clippings to pass therethrough;
   a tubular discharge chute comprising a first end, a second end, and a sidewall, wherein said tubular discharge chute is rotatably secured to a front surface of said planar baseplate, such that the tubular discharge chute does not pass the plane of a rear surface of said planar baseplate, wherein the rear surface of said planar baseplate is configured to abut a discharge port of a lawnmower, wherein said discharge port is aligned with said opening, wherein said tubular discharge chute fits over said opening of said planar baseplate, wherein said planar baseplate comprises one or more fasteners disposed on said rear surface thereof adapted to removably secure said planar baseplate to a lawnmower;
   wherein said tubular discharge chute is rotatably connected to said baseplate via a rotating mechanism, wherein said rotating mechanism allows said tubular discharge chute to rotate in 360 degrees;
   wherein said rotating mechanism is disposed between said planar baseplate and said tubular discharge chute;
   a vertical elongated rod adjustably secured to said planar baseplate having a first end and a second end, wherein said first end engages said rotating mechanism and said second end is adapted to be moved by a user in order to rotate said rotating mechanism.

2. The lawnmower discharge device of claim 1, wherein said rotating mechanism comprises a sprocket secured to said tubular discharge chute and said sprocket is operably connected to said planar baseplate, such that said sprocket rotates relative to said planar baseplate.

3. The lawnmower discharge device of claim 2, wherein said first end of said vertical elongated rod comprises a screw disposed adjacent to an engages said sprocket, wherein a tooth of said sprocket fits in to a thread of said screw, such that said screw is adapted to rotate said sprocket when said vertical elongated rod is turned by said user.

4. The lawnmower discharge device of claim 1, wherein said vertical elongated rod comprises a first shaft adjustably secured to a second shaft, wherein each of said first shaft and said second shaft comprise one or more apertures adapted to align and receive a fastener therethrough, such that a length of said vertical elongated rod is adjustable.

5. The lawnmower discharge device of claim 1, wherein said second end of said vertical elongated rod comprise a bend adapted to allow a user to rotate said second end.

6. The lawnmower discharge device of claim 1, wherein said vertical elongated rod is adjustably secured to said planar baseplate by an L-shaped bracket having a first part perpendicularly extending from a second part; said first part comprises an opening, such that said vertical elongated rod is disposed therethrough; said second part is secured to a rear surface of said planar baseplate.

7. The lawnmower discharge device of claim 1, wherein said one or more fasteners secured to said planar baseplate are hooks.

8. The lawnmower discharge device of claim 1, wherein said sidewall of said tubular discharge chute is curved.

9. The lawnmower discharge device of claim 1, wherein said second end of said tubular discharge chute is angled.

10. The lawnmower discharge device of claim 1, wherein said planar baseplate is rectangular in shape.

11. The lawnmower discharge device of claim 1, wherein said first end of said vertical elongated rod comprises an elongated panel having a plurality of teeth on a side thereof, wherein said plurality of teeth are disposed adjacent to and engage a sprocket, wherein a tooth of said sprocket fits between a plurality of teeth of said elongated panel, such that said elongated panel is adapted to rotate said sprocket when said vertical elongated rod is moved upwards or downwards by said user.

12. The lawnmower discharge device of claim 1, wherein said vertical elongated rod is adjustably secured to said planar baseplate by a pair of screws perpendicularly extending through an elongated slot disposed on a surface of said vertical elongated rod, such that said elongated slot is movably along an edge of said pair of screws.

13. The lawnmower discharge device of claim 1, wherein the opening is within the perimeter of the planar baseplate.

14. The lawnmower discharge device of claim 1, wherein the opening is circular.

15. The lawnmower discharge device of claim 1, wherein the tubular discharge chute extends perpendicularly from the planar baseplate.

* * * * *